March 11, 1941. W. S. GOERTZEN 2,234,243
BOB FOR FISHING LINES
Filed May 1, 1939 2 Sheets-Sheet 1

INVENTOR.
WILLIAM S. GOERTZEN
BY
ATTORNEY.

March 11, 1941.  W. S. GOERTZEN  2,234,243
BOB FOR FISHING LINES
Filed May 1, 1939  2 Sheets-Sheet 2
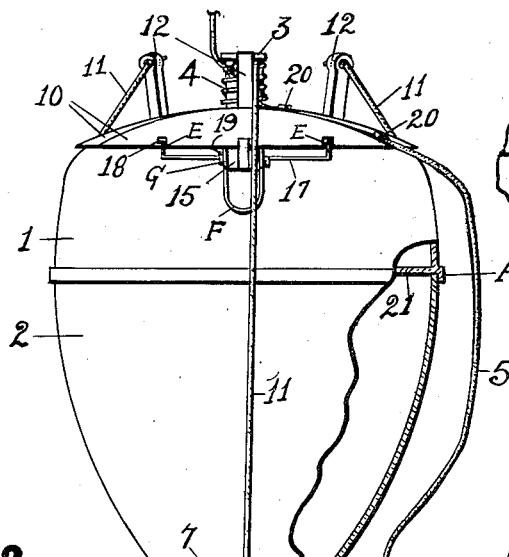
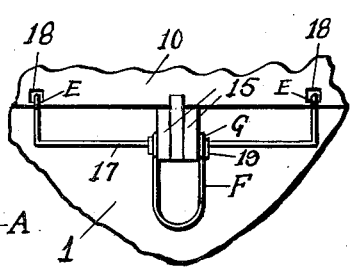
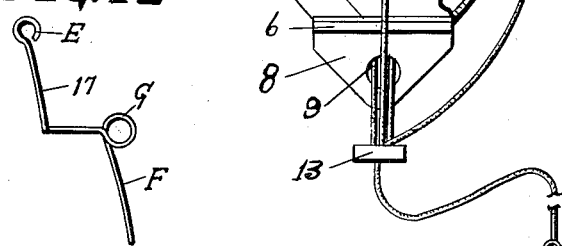
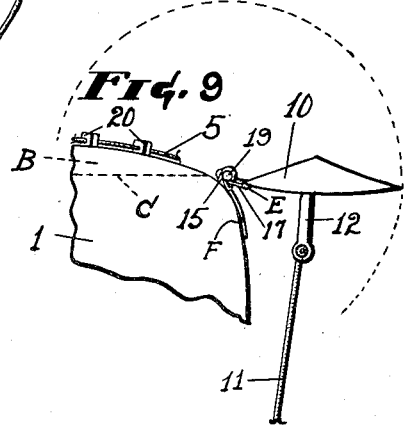
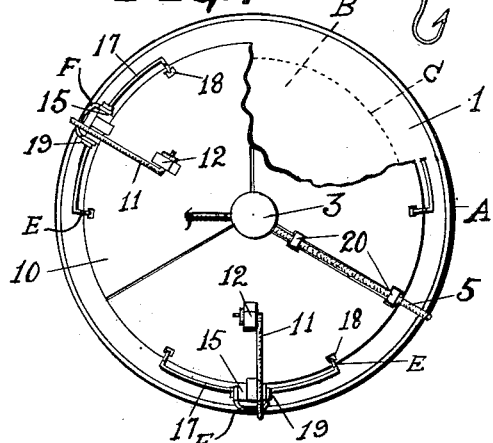
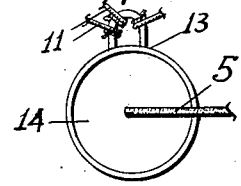
INVENTOR.
WILLIAM S. GOERTZEN
BY
ATTORNEY.

Patented Mar. 11, 1941

2,234,243

UNITED STATES PATENT OFFICE 2,234,243

BOB FOR FISHING LINES

William S. Goertzen, Newton, Kans.

Application May 1, 1939, Serial No. 270,957

4 Claims. (Cl. 43—49)

My invention relates to improvements in bobs for fishing lines, and has for its principal object a phosphorescent illuminating means placed within the body of the bob, and means to conceal and expose the illumination alternately.

A further object of my invention is to provide means whereby the illuminated portion of the bob will be exposed by the jerk of a fish on that portion of the line extending downward from the bob.

A still further object of my invention is to provide a bob having on its shell a feature of resistance created by a jerk of a fish upon the line carried by the bob, the resistance being through the medium of wings forced outward from the body of the bob at the instant of the jerk, whereby a greater resistance is had against submerging the bob to insure deep penetration of the hook when the fish bites.

A still further object of my invention is to provide a storage cavity in the body of the bob wherein extra lines, hooks, and sinkers may be stored without interfering with its function while fishing.

These and other objects will hereinafter be more fully explained, reference being had to the accompanying drawings, forming a part of this specification, in which like characters will apply to like parts in the different views.

Referring to the drawings:

Fig. 6 is a side view of the bob as modified, partly in section for convenience of illustration.

Fig. 7 is a plan view of Fig. 6, parts removed for convenience of description.

Fig. 8 is an enlarged detail view of the spring tensioning means for the rockable hood.

Fig. 9 is a fragmentary side view of the top of the bob illustrating the open position of one section of the hood.

Fig. 10 is a plan view of the disc that retains the line frictionally.

Fig. 11 is a diametrical sectional view of Fig. 10.

Fig. 12 is an end view of the spring illustrated in Fig. 8.

Figure 1:
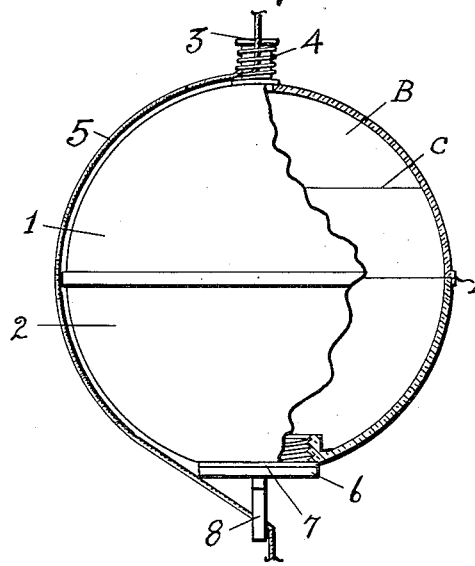
Fig. 1 is an elevation of the spherical hollow bob, parts removed for convenience of illustration.

The invention herein disclosed consists of a spherical hollow body comprised of two portions 1 and 2, said portions being connected by lapped engagement of the shell as shown at A, the position of which is at the center zone of the bob, and the said portion 1 being transparent or translucent, while portion 2 is opaque.

The shell portion 1 has a stem 3 outwardly extending and being on the axis transverse to the said lapped joint, and the said stem has wound thereon a spring element 4 by which means a fish line 5 is gripped by the coils of the spring to frictionally retain the cord against longitudinal movement except by manual force when setting a hook at a desired depth, the said hook not being shown in connection with Figs. 1 to 5 inclusive.

Positioned in the shell portion 2 opposite the stem is a removable plug 6, said plug being threaded to engage fluid tight in its respective threaded opening through the medium of a flexible gasket 7, as shown in Fig. 1. The said plug has an outward extension 8 diametrically crossing the same and integrally joined, functioning as a grip to turn the plug, and the said extending portion has an aperture 9 passing therethrough, and through which said line will extend, loosely engaging therein, the said plug, when removed, is accessible means to the hollow of the bob, by which arrangement extra line, hooks, and sinkers may be stored within said hollow, and furthermore will function as a ballast for an upward position of the transparent portion of the bob.

The said portion 1 of the bob has a coat of phosphorus or like substance applied to the inside wall thereof as at B, and terminating downward at line C, by which means the respective portion of the bob is visually observed in the dark by the illuminating power of the phosphorus transmitting its rays through the shell of the bob in connection therewith, this feature being convenient for subdued light or night fishing. The purpose of applying phosphorus on the inner surface of the shell is to avoid contact with the fingers therewith while handling the bob, as said phosphorus substance is adjudged poisonous, it being understood that the said stored articles will automatically position themselves by gravity while the bob is being manipulated by the line.

Figure 3:
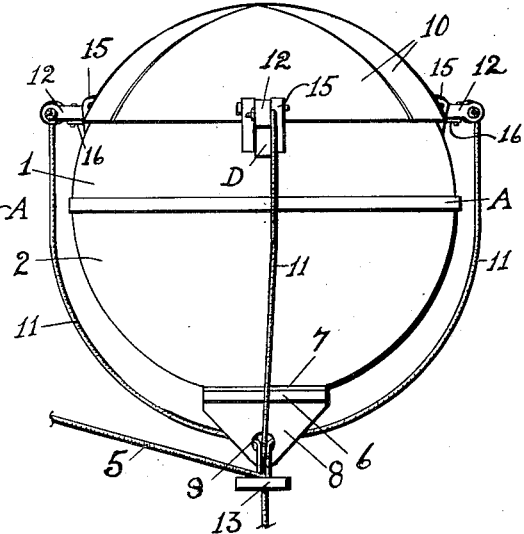
Fig. 3 is an elevation of the bob modified.
Figure 2:
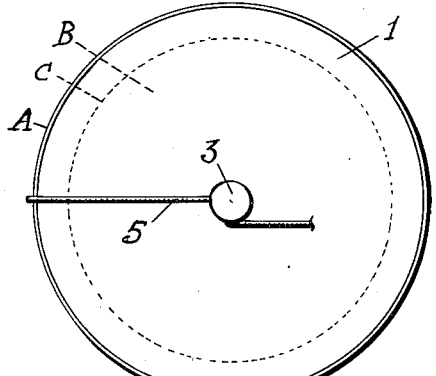
Fig. 2 is a plan view of the bob.
Figure 4:
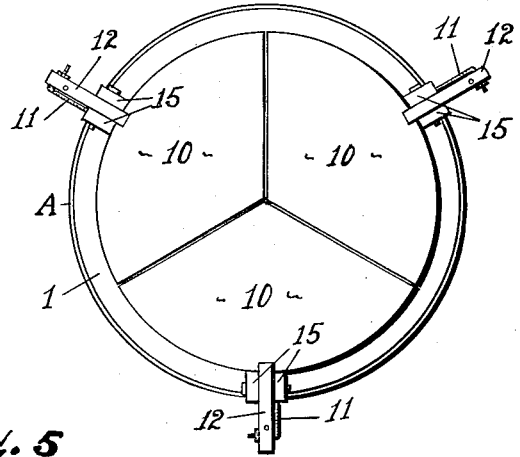
Fig. 4 is a plan view of Fig. 3.
Figure 5:
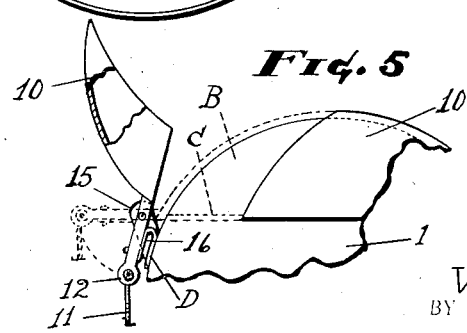
Fig. 5 is a fragmentary view showing the movement of one section of the hood.

In Figs. 3 to 5 inclusive is shown a method by which means the illuminate feature is enclosed, and furthermore disclosed by a jerk upon the line extending downward therefrom, the disclosed position being tensioned by a jerk of a fish upon the hook, while the bob is buoyantly carried by a body of water, at which instant the sections 10 of a hood enclosure will be moved upward and outward through the medium of lines 11, each of which are secured to their respective arms 12 outwardly extending from their respective hood sections, and from thence downward, connecting to the rim 13 of a disk 14 as simultaneous pulling means for said lines, and the said disc being apertured centrally to receive line 5 frictionally retained thereby at a desired length downward as the disc is preferably made of rubber, and the aperture being much smaller than the thickness of the line. Each of said hood sections are hingedly connected to the body of the bob by their respective arms pivotally engaging between ears 15, the latter being secured to the body of the bob, and each of said sections are tensioned to a closed position as shown in Figs. 3 and 4 by a leaf spring element 16 carried by each arm, the laterally bent portion of which, as at D, seats upon the body of the bob, the resiliency of which is mild but sufficient to retract the sections to a closed position when the line therebelow is released from tension, and the said hood sections each are highly polished on their concave sides functioning as a reflector for the illuminated portion of the shell when the hood sections are moved upward and outward from each other.

In Figs. 6 to 9 inclusive is shown a modification of the form of the bob body and hood sections. Each hood section as arranged in said figures has a spring 17 formed from a single piece of wire, the outer ends of which are hooked as at E to rockably engage in apertures 18 as shown in Figs. 6 to 9 inclusive, and the said springs, medial of their length, each have a U-bend F to bear on the body of the bob, and at the upper end of each leg of the U-bend is an eye G through which the hinge pin 19 extends as anchoring means for the spring.

It will now be seen that the said spring is arced as shown in Fig. 7 to disalign the hinge pin connection with each outer end connection of the spring, whereby tension is had to close the section. The modification also embodies the possibility of line 5 extending from its lower disc connection to the stem at the upper end of the bob, the said line lying between the edges of one pair of the sections and being retained therein by eye elements 20, through which said line extends; being so positioned, will avoid interference with the rocking movement of the hood sections.

The said hood sections, when turned outward to their extremity by a jerk of a fish, will function as a resistance at the time of submerging the bob, for the purpose described in the third object of this invention.

It will also be seen that the arms to which the lines connect are not elements of the hinge as of the former description relating to Figs. 3, 4, and 5, but the function of which is the same with respect to rocking the hood sections, and the said bob, as shown in Fig. 6 has a partition 21 as separating means between the illuminated portion and articles stored in the bob, and such other modifications may be employed as lie within the scope of the appended claims.

Having fully described my invention what I claim as new and desire to secure by Letters Patent is:

1. In bobs for fishing lines, a hollow body, a portion of which is transparent and a coat of phosphorus applied to the transparent portion, a line and a removable plug carried by the hollow body, the plug having an apertured extension, a sectionally divided hood to enclose the transparent portion, the sections each being hinged to the body of the bob, and an arm outwardly extending from each section, an apertured disc and a line for each arm, the lines extending through the aperture of the extension and being connected to the disc, and the aperture in said disc to frictionally engage the first said line as actuating means for the second said lines to open the sections, and a spring for each section to close the same when the tension of first said line is released.

2. In bobs for fishing lines, a bob of the class described, comprising a hollow body and a coat of phosphorus to illuminate a portion of the body and a sectionally divided hood to enclose the illuminated portion of the body, each hood section having an outwardly extending arm and being rockably hinged to the body in such a way as to move toward and from each other in their rocking movement, and each section having a spring to close the same, a stem outwardly extending and secured to the body where the free ends of the hood sections meet, the stem having a wire coil wound thereon to frictionally retain a line, an apertured flexible disc and a line connecting the arm of each hood section to the disc, each arm of the hood section having a line extending downward and around the body of the bob, and each being connected to the disc, another line to engage through the aperture of the disc and extending upward and being engaged by the winds of the coil about the stem, and eye means secured to the body of the bob to restrict the position of the line where the adjacent side edges of the hood meet, so that said sections are free to rock toward and from the line, said line being slack sufficient between said stem and said disc to cause said hood sections to rock outward by their respective lines as the disc is carried by a longitudinal movement of the last said line, all substantially as shown.

3. In bobs for fishing lines, a hollow body, a portion of which is transparent and a coat of phosphorus applied to the transparent portion, a hood to envelop the transparent portion, and means to rockably connect the hood to the body of the bob, a line, and means to connect the line to the rockable hood to rock the same from the transparent portion of the bob by a jerk on the line.

4. In bobs for fishing lines, a hollow body, a portion of which is transparent and a coat of phosphorus applied to the transparent portion, a sectionally divided hood, each section rockably connected to the body of the bob, a line, and means to connect the line for outward rocking movement of each section of the hood when the line is jerked.

WILLIAM S. GOERTZEN.